(12) United States Patent
Karnjate et al.

(10) Patent No.: US 8,050,836 B2
(45) Date of Patent: Nov. 1, 2011

(54) METHOD AND SYSTEM FOR DETERMINING INITIATION OF A PANIC BRAKING MANEUVER

(75) Inventors: Timothy M. Karnjate, Grand Blanc, MI (US); William K. Manosh, Lancaster, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 946 days.

(21) Appl. No.: 11/873,450

(22) Filed: Oct. 17, 2007

(65) Prior Publication Data

US 2009/0105919 A1    Apr. 23, 2009

(51) Int. Cl.
*G06F 7/00* (2006.01)

(52) U.S. Cl. ............... 701/70; 701/78; 701/83; 303/3; 303/9; 303/10; 303/62; 303/113.4; 340/463; 340/464; 340/468; 340/479; 188/358; 74/512; 74/513; 91/376 R; 91/369.2; 91/369.3

(58) Field of Classification Search ............. 701/70, 701/78, 83; 303/9.62, 10, 3, 155, 113.4, 303/116.1, 113.5, 122.12, DIG. 4, 113.1, 303/114.1, 114.3; 340/463, 464, 467, 468, 340/479; 188/358; 74/512, 513; 91/376 R, 91/369.2, 369.3
See application file for complete search history.

(56) References Cited

U.S. PATENT DOCUMENTS

| 5,230,549 A | | 7/1993 | Osada et al. |
|---|---|---|---|
| 5,779,329 A | | 7/1998 | Takeshima |
| 5,816,667 A | | 10/1998 | Jokic |
| 5,853,230 A | | 12/1998 | Wagner et al. |
| 5,931,545 A | * | 8/1999 | Yonemura et al. ............ 303/125 |
| 5,962,997 A | | 10/1999 | Maisch |
| 5,967,628 A | * | 10/1999 | Abe et al. .................. 303/122.12 |
| 6,021,365 A | * | 2/2000 | Ishii et al. ........................ 701/22 |
| 6,024,420 A | * | 2/2000 | Yonemura et al. ......... 303/113.2 |
| 6,099,086 A | | 8/2000 | Feigel et al. |
| 6,105,737 A | | 8/2000 | Weigert et al. |
| 6,109,703 A | | 8/2000 | Takahashi |
| 6,142,581 A | * | 11/2000 | Yamaguchi et al. ....... 303/113.2 |
| 6,212,459 B1 | * | 4/2001 | Unterforsthuber ............. 701/70 |

(Continued)

FOREIGN PATENT DOCUMENTS

DE    19712859 A1    10/1998

(Continued)

OTHER PUBLICATIONS

German Office Action dated May 11, 2010, for Application No. 102008051535.

(Continued)

*Primary Examiner* — James Trammell
*Assistant Examiner* — McDieunel Marc
(74) *Attorney, Agent, or Firm* — Ingrassia Fisher & Lorenz, P.C.

(57) ABSTRACT

A method for determining whether a panic braking maneuver has been initiated in a vehicle with a brake pedal includes the steps of receiving brake pedal travel data, receiving brake pedal force data, determining a rate of change of acceleration of the brake pedal from the brake pedal travel data, determining a rate of change of acceleration of force applied to the brake pedal from the brake pedal force data, comparing the rate of change of acceleration of the brake pedal with a first predetermined value and a third predetermined value, and comparing the rate of change of acceleration of force applied to the brake pedal with a second predetermined value and a fourth predetermined value.

20 Claims, 3 Drawing Sheets

U.S. PATENT DOCUMENTS

| | | | |
|---|---|---|---|
| 6,386,646 B1 * | 5/2002 | Hinz et al. | 303/11 |
| 6,457,785 B1 * | 10/2002 | Yonemura et al. | 303/182 |
| 6,473,681 B1 * | 10/2002 | Eckert et al. | 701/70 |
| 6,474,751 B1 * | 11/2002 | Yamaguchi et al. | 303/116.4 |
| 6,476,515 B1 * | 11/2002 | Yamamoto et al. | 307/10.1 |
| 6,637,839 B1 | 10/2003 | Fuchs et al. | |
| 7,117,072 B2 * | 10/2006 | Gehring et al. | 701/23 |
| 7,630,807 B2 * | 12/2009 | Yoshimura et al. | 701/48 |
| 7,634,345 B2 | 12/2009 | Karnjate et al. | |
| 7,826,952 B2 * | 11/2010 | Disser et al. | 701/70 |
| 2001/0005805 A1 * | 6/2001 | Saotome et al. | 701/67 |
| 2002/0163247 A1 * | 11/2002 | Yonemura et al. | 303/113.1 |
| 2003/0031578 A1 * | 2/2003 | Uchiyama et al. | 418/171 |
| 2005/0046272 A1 | 3/2005 | Reith et al. | |
| 2006/0220826 A1 * | 10/2006 | Rast | 340/479 |
| 2006/0287797 A1 * | 12/2006 | Haller et al. | 701/70 |
| 2008/0234907 A1 * | 9/2008 | Labuhn et al. | 701/70 |
| 2009/0082935 A1 * | 3/2009 | Leschuk et al. | 701/70 |
| 2009/0099744 A1 * | 4/2009 | Karnjate et al. | 701/70 |
| 2009/0099745 A1 * | 4/2009 | Karnjate et al. | 701/70 |
| 2010/0030421 A1 * | 2/2010 | Yoshimura et al. | 701/29 |

FOREIGN PATENT DOCUMENTS

| | | |
|---|---|---|
| DE | 10124591 A1 | 1/2002 |
| DE | 10118635 A1 | 5/2002 |
| DE | 102005021497 A1 | 11/2006 |
| DE | 102006013051 A1 | 9/2007 |
| WO | 0010852 A1 | 3/2000 |
| WO | 03022648 A1 | 3/2003 |
| WO | 2004085220 A1 | 10/2004 |

OTHER PUBLICATIONS

Office Action mailed Dec. 9, 2010, issued in U.S. Appl. No. 11/872,733.

Office Action issued on Feb. 25, 2010, for German Patent Application No. 102008051451, filed Oct. 13, 2008.

Office Action issued on Mar. 4, 2010, for German Patent Application No. 102008051452.

Office Action dated Jun. 23, 2010, issued in U.S. Appl. No. 11/872,733.

Response dated Sep. 22, 2010, for U.S. Appl. No. 11/872,733.

U.S. Office Action for U.S. Appl. No. 11/872,730 mailed Jan. 6, 2011.

U.S. Office Action for U.S. Appl. No. 11/872,733 mailed May 25, 2011.

U.S. Final Office Action for U.S. Appl. No. 11/872,730 mailed Jun. 22, 2011.

* cited by examiner

METHOD AND SYSTEM FOR DETERMINING INITIATION OF A PANIC BRAKING MANEUVER

TECHNICAL FIELD

The present invention generally relates to the field of braking systems for vehicles and, more specifically, to a method and system for determining when a panic braking maneuver has been initiated.

BACKGROUND OF THE INVENTION

To enhance an operator's driving experience and a vehicle's performance and safety, various types of electronic enhancements and systems assist or replicate automotive systems that were previously mechanical in nature. One such automotive system is the brake-by-wire system. In a brake-by-wire system, an operator's activation of the brake pedal is determined by one or more sensors. Data from the sensors is then used by a computer or processor to determine an appropriate braking force to apply to the brakes.

Several different types of brake-by-wire systems exist. For example, in an electro-hydraulic braking system, the computer commands an electro-hydraulic actuator to apply hydraulic pressure to the brake calipers to stop the vehicle. In contrast, in an electromechanical braking system, the braking force is applied instead by an electronic caliper which utilizes a small motor to push the brake pads against the rotor to stop the vehicle. Additionally, vehicles can incorporate combined systems such as electro-mechanical and electro-hydraulic systems. Also, hybrid cars can utilize a combination of friction braking, which can be electromechanical or electro-hydraulic, and regenerative braking, which is also a type of electronic braking in which speed is reduced by converting kinetic energy into electrical energy.

Regardless of the particular type of braking system, an important feature of many braking systems is the ability to respond appropriately during panic braking situations. In a panic braking situation, the vehicle operator typically applies force to the brake pedal at a very rapid rate, but not necessarily with a large enough force to decelerate the vehicle fast enough, based on the force alone. However, it can be difficult to determine, quickly and accurately, when a panic braking maneuver has been initiated. For example, certain existing systems make panic braking determinations based solely on a single variable such as pedal travel rate. While such determinations may generally be accurate, in certain situations improved accuracy and/or quicker determinations may be beneficial, for example with electrohydraulic braking systems in which quick determinations are at a premium.

Accordingly, it is desirable to provide improved methods and systems for determining when a panic braking maneuver has been initiated in a vehicle. It is also desirable to provide such methods and systems that make such determinations accurately and/or quickly. Furthermore, other desirable features and characteristics of the present invention will be apparent from the subsequent detailed description and the appended claims, taken in conjunction with the accompanying drawings and the foregoing technical field and background.

SUMMARY OF THE INVENTION

In accordance with an exemplary embodiment of the present invention, a method is provided for determining whether a panic braking maneuver has been initiated in a vehicle with a brake pedal. The method comprises the steps of receiving brake pedal travel data, receiving brake pedal force data, determining a rate of change of acceleration of the brake pedal from the brake pedal travel data, determining a rate of change of acceleration of force applied to the brake pedal from the brake pedal force data, comparing the rate of change of acceleration of the brake pedal travel with a first predetermined value and a third predetermined value, and comparing the rate of change of acceleration of force applied to the brake pedal with a second predetermined value and a fourth predetermined value.

In accordance with another exemplary embodiment of the present invention, a system for determining whether a panic braking maneuver has been initiated in a vehicle with a brake pedal is provided. The system comprises a first sensor, a second sensor, and a processor. The first sensor is configured to generate travel data indicative of a distance the brake pedal has been displaced. The second sensor is configured to generate force data indicative of an amount of force applied to the brake pedal. The processor is configured to determine a rate of change of acceleration of the distance the brake pedal has been displaced, based on the travel data, determine a rate of change of acceleration of the force applied to the brake pedal, based on the force data, compare the rate of change of acceleration of the distance the brake pedal has been displaced with a first predetermined value and a third predetermined value, and compare the rate of change of acceleration of the force applied to the brake pedal with a second predetermined value and a fourth predetermined value.

In accordance with a further exemplary embodiment of the present invention, a braking system for a vehicle is provided. The braking system comprises a brake pedal, a brake pedal travel sensor, a brake pedal force sensor, a brake controller, and a plurality of brake units. The brake pedal travel sensor is configured to generate travel data indicative of a distance the brake pedal has been displaced. The brake pedal force sensor is configured to generate force data indicative of an amount of force applied to the brake pedal. The brake controller is configured to determine a rate of change of acceleration of the distance the brake pedal has been displaced, based on the travel data, determine a rate of change of acceleration of the force applied to the brake pedal, based on the force data, compare the rate of change of acceleration of the distance the brake pedal has been displaced with a first predetermined value and a third predetermined value, compare the rate of change of acceleration of the force applied to the brake pedal with a second predetermined value and a fourth predetermined value, and issue braking commands based at least in part on the comparisons. The plurality of brake units are coupled to the brake controller and are configured to receive and implement the braking commands therefrom.

DESCRIPTION OF THE DRAWINGS

The present invention will hereinafter be described in conjunction with the following drawing figures, wherein like numerals denote like elements, and wherein.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
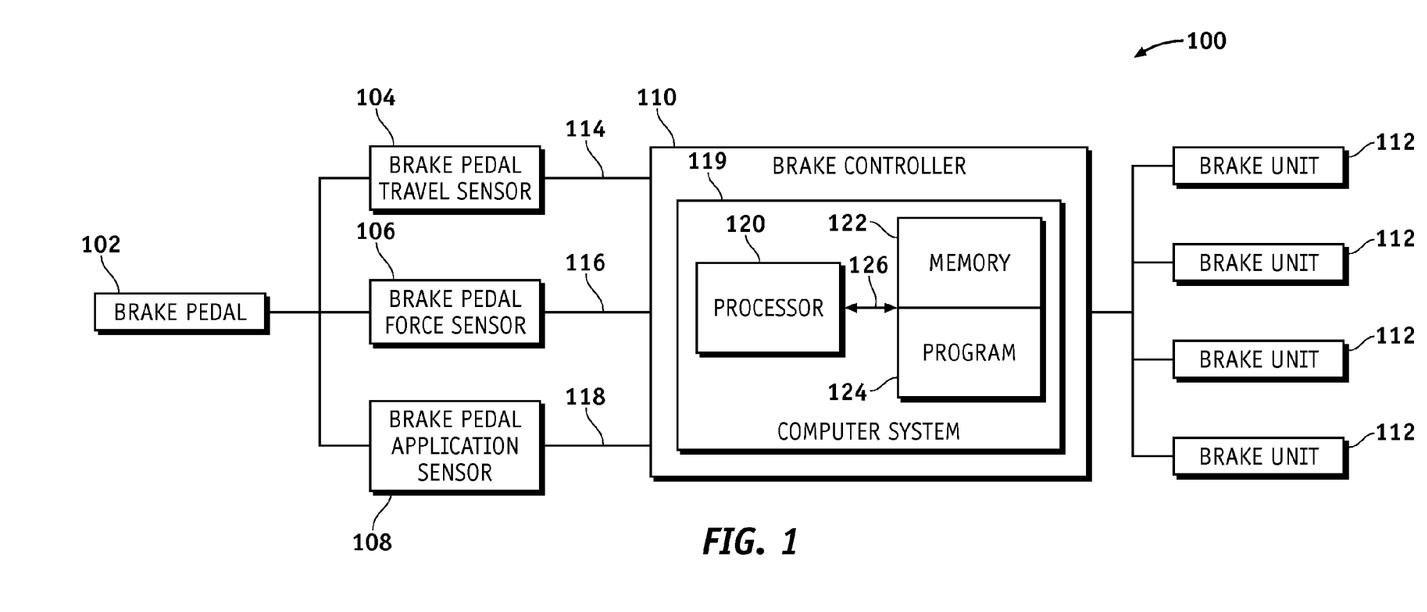
FIG. 1 is a block diagram of an exemplary vehicle braking system that can be used in determining when a panic braking maneuver has been initiated.

FIG. 1 is a block diagram of an exemplary braking system 100 for use in a brake-by-wire system. Braking system 100 includes a brake pedal 102, a brake pedal travel sensor 104, a brake pedal force sensor 106, a brake pedal application sensor 108, a brake controller 110, and a plurality of brake units 112. The brake pedal 102 provides an interface between an operator of a vehicle and a braking system or a portion thereof, such as the braking system 100, which is used to slow or stop the vehicle. To initiate the braking system 100, an operator would typically use his or her foot to apply a force to the brake pedal 102 to move the brake pedal 102 in a generally downward direction. In one preferred embodiment the braking system 100 is an electro-hydraulic system.

The brake pedal travel sensor 104, the brake pedal force sensor 106, and the brake pedal application sensor 108 are coupled to the brake pedal 102. The brake pedal travel sensor 104 provides an indication of how far the brake pedal 102 has traveled, which is also known as brake pedal travel, when the operator applies force to the brake pedal 102. In one exemplary embodiment, brake pedal travel can be determined by how far an input rod in a brake master cylinder has moved. Other methods of measuring brake travel can also be utilized. Regardless of the particular method utilized, the brake pedal travel sensor 104 collects brake pedal travel data for ultimate use by the brake controller 110 in determining when a panic braking maneuver has been initiated, as described further below.

The brake pedal force sensor 106 determines how much force the operator of braking system 100 is applying to the brake pedal 102. This is also known as brake pedal force. In one exemplary embodiment, the brake pedal force sensor 106 may include a hydraulic pressure emulator and/or a pressure transducer, and the brake pedal force can be determined by measuring hydraulic pressure in a master cylinder of the braking system 100. Other methods of determining the amount of brake pedal force can also be used. Regardless of the particular method utilized, the brake pedal force sensor 106 collects brake pedal force data for ultimate use by the brake controller 110 in determining when a panic braking maneuver has been initiated, as described further below.

The brake pedal application sensor 108 senses whether an operator is currently applying force to the brake pedal 102, for example by sensing when an operator's foot is in contact with the brake pedal 102. In one exemplary embodiment, the brake pedal application sensor 108 activates a brake light activation switch when the vehicle operator is currently applying force to the brake pedal 102, although it will be appreciated that other types of brake pedal application sensors 108 may also be used. Regardless of the particular type used, the brake pedal application sensor 108 collects brake activation data to further assist the brake controller 110 in determining when a panic braking maneuver has been initiated, as also described further below.

The brake controller 110 is coupled to the brake pedal travel sensor 104, the brake pedal force sensor 106, and the brake pedal application sensor 108, as well as to the brake units 112. The brake controller 110 receives a first input 114 from the brake pedal travel sensor 104, namely brake pedal travel data, a second input 116 from the brake pedal force sensor 106, namely brake pedal force data, and a third input 118 from the brake pedal application sensor 108, namely brake pedal application data. As described in more detail below, the brake controller 110 uses values from the first, second, and third inputs 114, 116, and 118 to perform various calculations, comparisons, and determinations, such as calculating rates of change of acceleration of the brake pedal 102 and rates of change of acceleration of force applied to the brake pedal 102, comparing such values with predetermined values over different periods of time, and determining whether the operator is currently applying the brake pedal 102. The brake controller 110 uses such calculations, comparisons, and determinations in determining when a panic braking maneuver has been initiated, and in ultimately controlling the brake units 112 accordingly with appropriate brake commands based on the determinations.

In the depicted embodiment, the brake controller 110 includes a computer system 119 that includes a processor 120, a memory 122, and a bus 126. The processor 120 performs the computation and control functions of the brake controller 110, and may comprise any type of processor or multiple processors, single integrated circuits such as a microprocessor, or any suitable number of integrated circuit devices and/or circuit boards working in cooperation to accomplish the functions of a processing unit. During operation, the processor 120 executes one or more programs 124 contained within the memory 122 and, as such, controls the general operation of the computer system 119. The memory 122 can be any type of suitable memory. This would include the various types of dynamic random access memory (DRAM) such as SDRAM, the various types of static RAM (SRAM), and the various types of non-volatile memory (PROM, EPROM, and flash). The bus 126 serves to transmit programs, data, status and other information or signals between the various components of the computer system 119. The bus 126 can be any suitable physical or logical means of connecting computer systems and components. This includes, but is not limited to, direct hard-wired connections, fiber optics, infrared and wireless bus technologies. During operation, the program 124 is stored in the memory 122 and executed by the processor 120. It will be appreciated that the brake controller 110 may differ from the embodiment depicted in FIG. 1, for example in that the brake controller 110 may be coupled to or may otherwise utilize one or more remote computer systems and/or other control systems.

The brake units 112 receive the brake commands from the brake controller 110, and are controlled thereby accordingly. The brake units 112 can include any number of different types of devices that, upon receipt of brake commands, can apply the proper braking torque as received from the brake controller 110. For example, in an electro-hydraulic system, the brake units 112 can comprise an actuator that can generate hydraulic pressure that can cause brake calipers to be applied to a brake disk to induce friction to stop a vehicle. Alternatively, in an electromechanical brake-by-wire system, the brake units 112 can comprise a wheel torque-generating device that operates as a vehicle brake. The brake units 112 can also be regenerative braking devices, in which case the brake units 112, when applied, at least facilitate conversion of kinetic energy into electrical energy.

Figure 2:
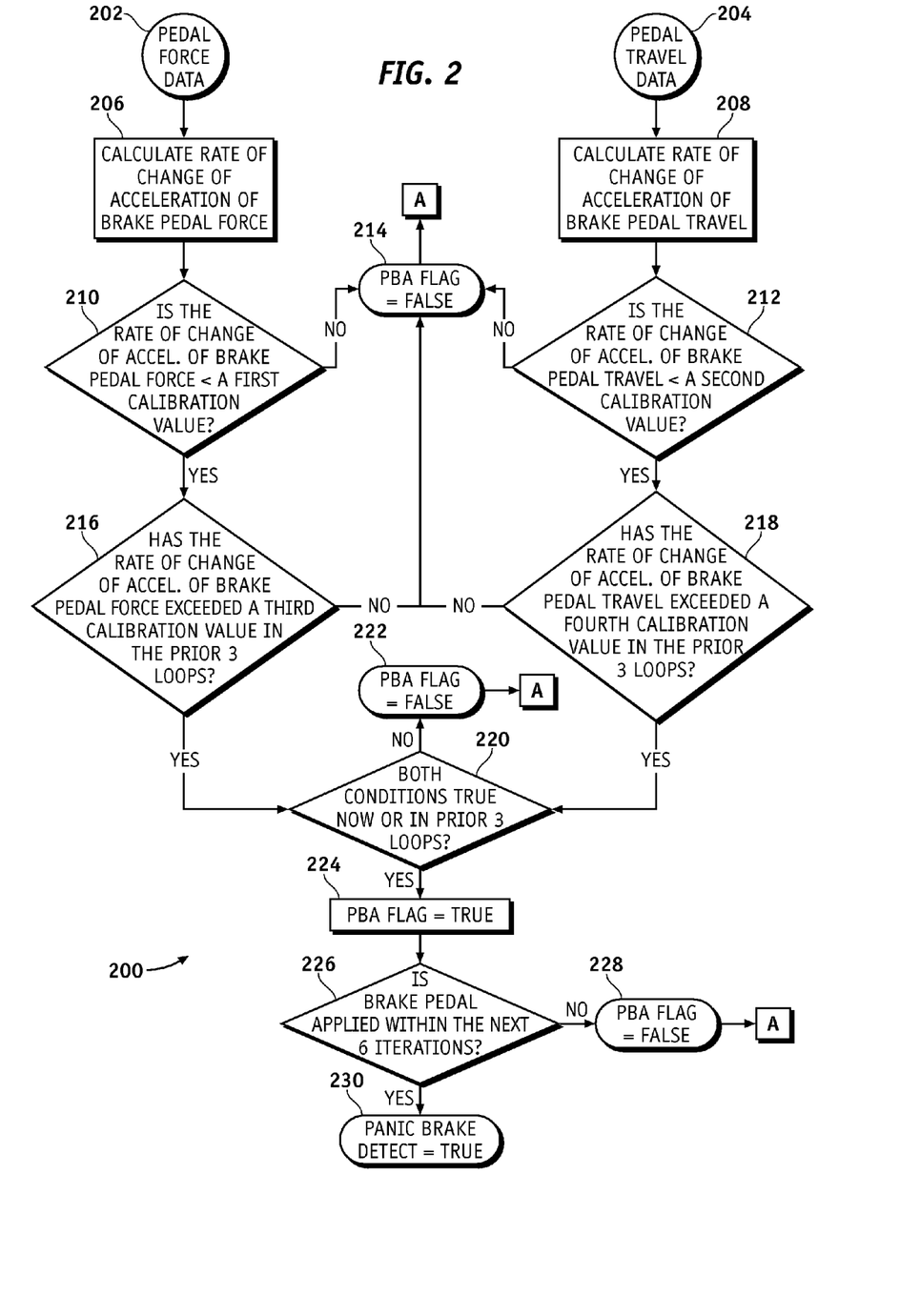
FIG. 2 is a flowchart illustrating a process for determining when a panic braking maneuver has been initiated, that can be used in connection with the braking system of FIG. 1.

FIG. 2 is a flowchart illustrating an exemplary embodiment of a process 200 for determining when a panic braking maneuver has been initiated. The process 200 is preferably implemented with a number of consecutive loops over a period of time during vehicle operation. At any particular point in time, an ongoing loop is referred to as the present loop. There may be any number of prior loops and subsequent loops occurring before and after the present loop, respectively.

Process 200 commences with the calculation of a rate of change of acceleration of brake pedal force (step 206). Meanwhile, in step 208, a rate of change of acceleration of brake pedal travel is calculated. In a preferred embodiment, the rate of change of acceleration of brake pedal travel is calculated from brake pedal travel data 204 collected by the brake pedal travel sensor 104 of FIG. 1. These calculations, as well as the various other calculations, comparisons, and determinations referenced herein, are preferably conducted by the brake controller 110, and most preferably by a processor 120 therein or used in connection thereof, such as that described above in connection with FIG. 1. Steps 206 and 208, along with various other steps of the process 200, may be conducted simultaneously or in either order, and are preferably conducted continuously throughout the process 200 so as to obtain new values in each iteration of the process 200.

In step 210, a determination is made as to whether the rate of change of acceleration of brake pedal force is less than a first predetermined calibration value. The first predetermined calibration value represents a value below which the rate of change of acceleration of brake pedal force would typically decrease during a panic braking maneuver shortly after a sharp increase in the rate of change of acceleration of brake pedal force. The first predetermined calibration value can be obtained through experimental data, literature in the field, and/or other sources, and will generally vary depending on the type of vehicle and the type of braking system installed therein.

Meanwhile, in step 212, a determination is made as to whether the rate of change of acceleration of brake pedal travel is less than a second predetermined calibration value. The second predetermined calibration value represents a value below which the rate of change of acceleration of brake pedal travel would typically decrease during a panic braking maneuver shortly after a sharp increase in the rate of change of acceleration of brake pedal travel. Similar to the first predetermined calibration value, the second predetermined calibration value can be obtained through experimental data, literature in the field, and/or other sources, and will generally vary depending on the type of vehicle and the type of braking system installed therein.

If it is determined in steps 210 and 212 that either the rate of change of acceleration of brake pedal force is greater than or equal to the first predetermined calibration value or that the rate of change of acceleration of brake pedal travel is greater than or equal to the second predetermined calibration value, or both, then the process proceeds to step 214, in which a panic braking assist flag is set to false, thereby indicating that a panic braking maneuver has not been initiated. In other words, under this scenario, the process has not detected a decrease in both the rate of change of acceleration of brake pedal force and the rate of change of acceleration of brake pedal travel. Following step 214, the process returns to steps 206 and 208 and begins a new iteration.

Conversely, if it is determined in steps 210 and 212 that both the rate of change of acceleration of brake pedal force is less than the first predetermined calibration value and the rate of change of acceleration of brake pedal travel is less than the second predetermined calibration value, then the process proceeds to steps 216 and 218. In other words, under this scenario, the process has detected a decrease in both the rate of change of acceleration of brake pedal force and the rate of change of acceleration of brake pedal travel. Accordingly, in steps 216 and step 218, the process determines whether a sharp increase in the rate of change of acceleration of brake pedal force and the rate of change of acceleration of brake pedal travel has preceded the decreases in these values detected in steps 210 and 212 in a relatively short period of time (e.g. a few iterations), as would generally be associated with a panic braking maneuver shortly following a sharp increase in these values.

Specifically, in step 216, a determination is made as to whether the rate of change of acceleration of brake pedal force has exceeded a third predetermined calibration value within a predetermined number of prior iterations. The third predetermined calibration value represents a value above which the rate of change of acceleration of brake pedal force would typically rise during a panic braking maneuver shortly before the decrease detected in step 210. Meanwhile, in step 218, a determination is made as to whether the rate of change of acceleration of brake pedal travel has exceeded a fourth predetermined calibration value within the predetermined number of prior iterations. The fourth predetermined calibration value represents a value above which the rate of change of acceleration of brake pedal travel would typically rise during a panic braking maneuver shortly before the decrease detected in step 212. Similar to the first and second predetermined calibration values, the third and fourth predetermined calibration values can be obtained through experimental data, literature in the field, and/or other sources, and will generally vary depending on the type of vehicle and the type of braking system installed therein. In the depicted embodiment steps 216 and 218 refer to the three immediately preceding prior iterations; however, this may vary in other embodiments, for example in that a different number of prior iterations may be used in the determination.

Based on the results of steps 216 and 218, a determination is made in step 220 as to whether both the rate of change of acceleration of brake pedal force has exceeded the third predetermined calibration value in the three immediately preceding prior iterations and the rate of change of acceleration of brake pedal travel has exceeded the fourth predetermined calibration value in the three immediately preceding prior iterations. If it is determined in steps 216 and 218 that either the rate of change of acceleration of brake pedal force has not exceeded the third predetermined calibration value in the three immediately preceding prior iterations or the rate of change of acceleration of brake pedal travel has not exceeded the fourth predetermined calibration value in the three immediately preceding prior iterations, or both, then the process proceeds to step 222, in which the panic braking assist flag is set to false, thereby indicating that a panic braking maneuver has not been initiated. Following step 222, the process returns to steps 206 and 208 and beings a new iteration.

Conversely, if it is determined in step 220 that both the rate of change of acceleration of brake pedal force has exceeded the third predetermined calibration value in at least one of the three immediately preceding prior iterations and the rate of change of acceleration of brake pedal travel has exceeded the fourth predetermined calibration value in at least one of the three immediately preceding prior iterations, then the process proceeds to step 224, in which the panic braking assist flag is set to true, thereby indicating that a panic braking maneuver has potentially been initiated, pending a final check in step 226.

Following step 224, the process proceeds to the above-mentioned step 226, in which a determination is made as to whether a brake pedal is currently being applied or is subsequently applied within a specified amount of time. In the depicted embodiment, step 226 is conducted repeatedly for a period of time equal to six iterations, for example by checking whether a brake light switch associated with the brake pedal application sensor 108 from FIG. 1 has been activated during this time. However, the amount of time used for the determination in step 226, and/or the manner of the determination, may vary in other embodiments. Regardless of the amount of time used and the manner of the determination, step 226 provides a final check as to whether a panic braking maneuver has been initiated.

If it is determined in step 226 that the brake pedal is not currently being applied and is not subsequently applied within the specified amount of time, then the process proceeds to step 228, in which the panic braking assist flag is set to false, thereby indicating that a panic braking maneuver has not been initiated. Following step 228, the process returns to steps 206 and 208 and beings a new iteration.

Conversely, if it is determined in step 226 that the brake pedal is currently being applied or is subsequently applied within the specified amount of time, then the process proceeds to step 230, in which the panic braking assist flag is set to true, thereby indicating that a panic braking maneuver has been initiated. Appropriate panic braking action then can be implemented. For example, in a preferred embodiment, a panic braking algorithm is then initiated.

Figure 3:
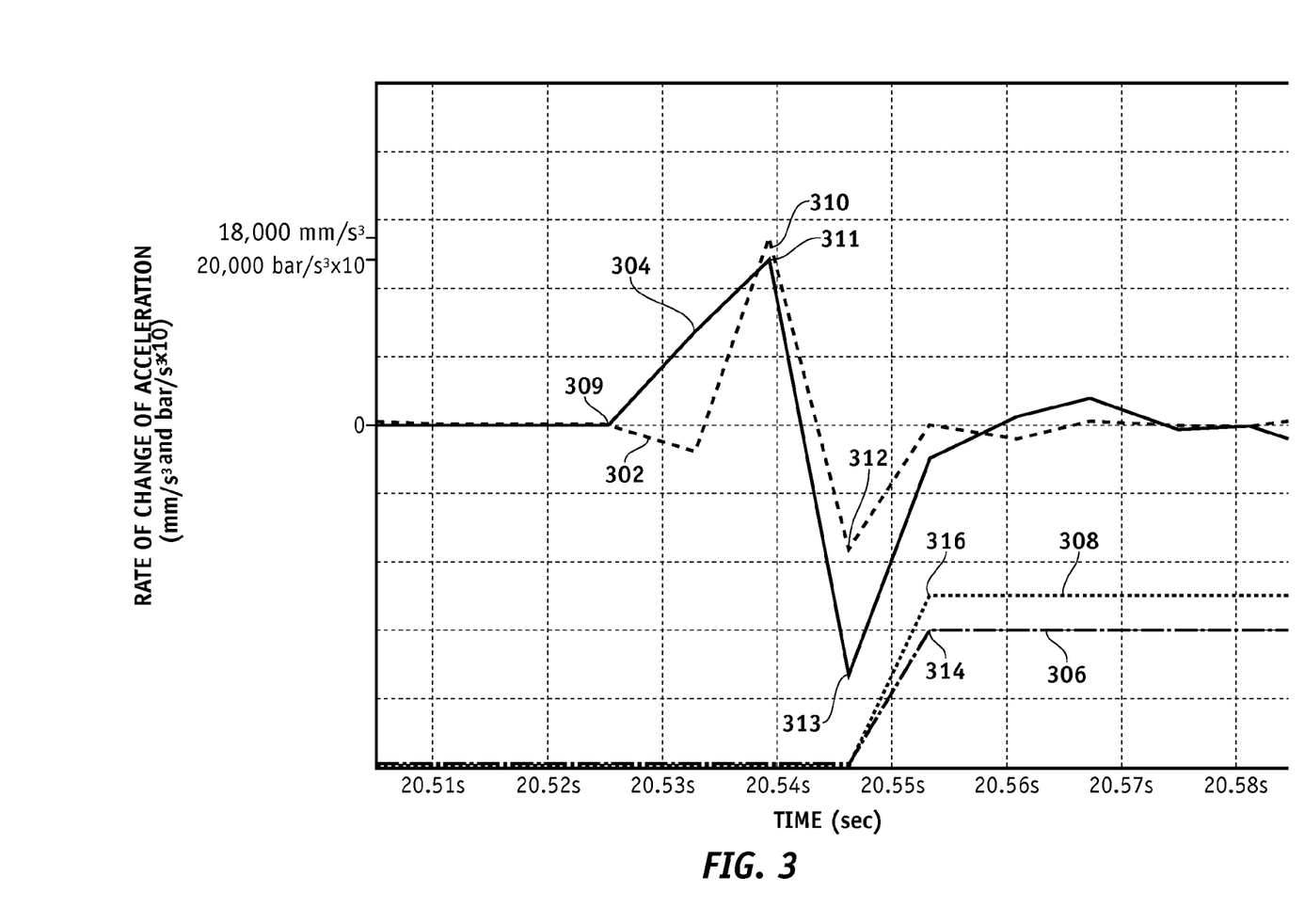
FIG. 3 is a graphical representation of an exemplary episode in which a driver of a vehicle has applied force to a brake pedal of the vehicle braking system of FIG. 1 and in which the process of FIG. 2 has been applied.

FIG. 3 is a graphical representation of an exemplary episode in which a driver of a vehicle has applied force to the brake pedal 102 of the braking system 100 of FIG. 1 and in which the process 200 of FIG. 2 has been applied. Specifically, FIG. 3 includes a brake pedal travel rate of change of acceleration curve 302, a brake pedal force rate of change of acceleration curve 304, a brake pedal application indicator curve 306, and a panic brake flag curve 308 (that denotes whether a panic braking event has been detected), each depicting respective values for the particular exemplary episode. The x-axis represents time (measured in sec), and the y-axis represents rate of change of acceleration (measured in mm/sec$^3$ and bar/s$^3$×10).

As shown in FIG. 3, the driver has placed a foot against the brake pedal 102 at point 309. Subsequently, a determination is made that a panic braking maneuver has been initiated after each of the following has occurred: (i) the brake pedal travel rate of change of acceleration curve 302 and the brake pedal force rate of change of acceleration curve 304 have reached respective peaks 310 and 311 in proximity to one another (corresponding to steps 216 and 218 of FIG. 2); (ii) the brake pedal travel rate of change of acceleration curve 302 and the brake pedal force rate of change of acceleration curve 304 have subsequently reached respective valleys 312 and 313 in proximity to one another and within a relatively short number of iterations following the respective peaks 310 and 311 (corresponding to steps 210 and 212 of FIG. 2); (iii) the panic brake flag is triggered (corresponding to step 224 of FIG. 2) shortly after these events as shown at point 316 of the panic brake flag curve 308; and (iv) the brake pedal application indicator curve 306 has risen to a level, at point 314, to indicate that an operator's foot has been on the brake pedal 102 during a prior iteration (corresponding to step 226 of FIG. 2). Accordingly, upon satisfaction of these criteria (shown at points 314, 316 in FIG. 3), a determination has been made that a panic braking maneuver has been initiated (corresponding to step 230 of FIG. 2).

The braking system 100 and the process 200 allow panic braking determinations to be made with greater accuracy and reliability. In addition, the braking system 100 and the process 200 can provide such determinations more quickly, and can be potentially tailored to the needs of specific vehicles and implementations.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for determining whether a panic braking maneuver has been initiated in a vehicle with a brake pedal, the method comprising the steps of:
    receiving brake pedal travel data;
    receiving brake pedal force data;
    determining a rate of change of acceleration of the brake pedal from the brake pedal travel data via a processor;
    determining a rate of change of acceleration of force applied to the brake pedal from the brake pedal force data via the processor;
    comparing the rate of change of acceleration of the brake pedal with a first predetermined value and a third predetermined value via the processor;
    comparing the rate of change of acceleration of force applied to the brake pedal with a second predetermined value and a fourth predetermined value via the processor; and
    providing an indication that a panic braking maneuver has been initiated, if it is determined by the processor that:
        the rate of change of acceleration of the brake pedal is less than the first predetermined value;
        the rate of change of acceleration of force applied to the brake pedal is less than the second predetermined value;
        the rate of change of acceleration of the brake pedal was previously greater than the third predetermined value; and
        the rate of change of acceleration of force applied to the brake pedal was previously greater than the fourth predetermined value.

2. The method of claim 1, wherein the rate of change of acceleration of the brake pedal is compared with at least one of the first and third predetermined values, and the rate of change of acceleration of force applied to the brake pedal is compared with at least one of the second and fourth predetermined values, over multiple iterations, including a present iteration and a plurality of prior iterations.

3. The method of claim 2, wherein the step of providing the indication comprises the step of:
    providing the indication that a panic braking maneuver has been initiated, if it is determined that:
    the rate of change of acceleration of the brake pedal is less than the first predetermined value during the present iteration;
    the rate of change of acceleration of force applied to the brake pedal is less than the second predetermined value during the present iteration;
    the rate of change of acceleration of the brake pedal was greater than the third predetermined value during the plurality of prior iterations; and the rate of change of acceleration of force applied to the brake pedal was greater than the fourth predetermined value during the plurality of prior iterations.

4. The method of claim 3, wherein the plurality of prior iterations includes three consecutive iterations immediately preceding the present iteration.

5. The method of claim 3, further comprising the steps of:
determining whether the brake pedal is applied by a driver; and
providing the indication that a panic braking maneuver has been initiated only upon the further condition that it is determined that the brake pedal is applied by the driver.

6. The method of claim 5, wherein the step of determining whether the brake pedal is applied by the driver comprises the step of:
determining whether a brake light switch has been activated during the present iteration or a subsequent iteration.

7. A system for determining whether a panic braking maneuver has been initiated in a vehicle with a brake pedal, the system comprising:
a first sensor configured to generate travel data indicative of movement of the brake pedal;
a second sensor configured to generate force data indicative of force applied to the brake pedal; and
a processor configured to:
determine a rate of change of acceleration of the brake pedal based on the travel data;
determine a rate of change of acceleration of force applied to the brake pedal based on the force data;
compare the rate of change of acceleration of the brake pedal with a first predetermined value and a third predetermined value;
compare the rate of change of acceleration of force applied to the brake pedal with a second predetermined value and a fourth predetermined value; and
provide an indication that a panic braking maneuver has been initiated, if it is determined that:
the rate of change of acceleration of the brake pedal is less than the first predetermined value;
the rate of change of acceleration of force applied to the brake pedal is less than the second predetermined value;
the rate of change of acceleration of the brake pedal was previously greater than the third predetermined value; and
the rate of change of acceleration of force applied to the brake pedal was previously greater than the fourth predetermined value.

8. The system of claim 7, further comprising:
a memory configured to store values of the travel data and force data;
wherein the processor is further configured to compare the rate of change of acceleration of the brake pedal with at least one of the first and third predetermined values, and to compare the rate of change of acceleration of force applied to the brake pedal with at least one of the second and fourth predetermined values, over multiple iterations, including a present iteration and a plurality of prior iterations, based at least in part on the stored values.

9. The system of claim 8, wherein the processor is further configured to provide the indication that a panic braking maneuver has been initiated, if it is determined that:
the rate of change of acceleration of the brake pedal is less than the first predetermined value during the present iteration;

the rate of change of acceleration of force applied to the brake pedal is less than the second predetermined value during the present iteration;
the rate of change of acceleration of the brake pedal was greater than the third predetermined value during the plurality of prior iterations; and
the rate of change of acceleration of force applied to the brake pedal was greater than the fourth predetermined value during the plurality of prior iterations.

10. The system of claim 9, further comprising:
a third sensor configured to determine whether the brake pedal is applied by a driver and generate a signal if the brake pedal is applied by the driver.

11. The system of claim 10, wherein the processor is further configured to:
receive the signal from the third sensor; and
provide the indication that a panic braking maneuver has been initiated only upon the further condition that the brake pedal is applied by the driver during any of the present iteration or a plurality of subsequent iterations.

12. A braking system for a vehicle, comprising:
a brake pedal;
a brake pedal travel sensor configured to generate travel data indicative of movement of the brake pedal;
a brake pedal force sensor configured to generate force data indicative of force applied to the brake pedal; and
a brake controller configured to:
determine a rate of change of acceleration of the brake pedal, based on the travel data;
determine a rate of change of acceleration of force applied to the brake pedal, based on the force data;
compare the rate of change of acceleration of the brake pedal with a first predetermined value and a third predetermined value;
compare the rate of change of acceleration of the force applied to the brake pedal with a second predetermined value and a fourth predetermined value;
provide an indication that a panic braking maneuver has been initiated, if it is determined that:
the rate of change of acceleration of the brake pedal is less than the first predetermined value;
the rate of change of acceleration of force applied to the brake pedal is less than the second predetermined value;
the rate of change of acceleration of the brake pedal was previously greater than the third predetermined value; and
the rate of change of acceleration of force applied to the brake pedal was previously greater than the fourth predetermined value; and
issue braking commands based at least in part on the comparisons and the indication; and
a plurality of brake units coupled to the brake controller and configured to receive and implement the braking commands therefrom.

13. The braking system of claim 12, wherein the brake controller is further configured to compare the rate of change of acceleration of the brake pedal with at least one of the first and third predetermined values, and to compare the rate of change of acceleration of force applied to the brake pedal with at least one of the second and fourth predetermined values over multiple iterations, including a present iteration and a plurality of prior iterations.

14. The braking system of claim 13, wherein the brake controller is further configured to provide the indication that a panic braking maneuver has been initiated if it is determined that:

the rate of change of acceleration of the brake pedal is less than the first predetermined value during the present iteration;

the rate of change of acceleration of force applied to the brake pedal is less than the second predetermined value during the present iteration;

the rate of change of acceleration of the brake pedal was greater than the third predetermined value during the plurality of prior iterations; and the rate of change of acceleration of force applied to the brake pedal was greater than the fourth predetermined value during the plurality of prior iterations.

15. The braking system of claim 14, further comprising:
a brake pedal application sensor configured to determine whether the brake pedal is applied by a driver and generate a signal if the brake pedal is applied by the driver.

16. The braking system of claim 15, wherein the brake controller is further configured to:
receive the signal from the brake pedal application sensor; and
provide the indication that a panic braking maneuver has been initiated only upon the further condition that the brake pedal is applied by the driver during any of the present iteration or a plurality of subsequent iterations.

17. The braking system of claim 14, wherein the plurality of prior iterations includes three consecutive iterations immediately preceding the present iteration.

18. The braking system of claim 12, wherein the brake controller is further configured to implement a panic braking algorithm, if the indication is provided that a panic braking maneuver has been initiated.

19. The braking system of claim 12, wherein the braking system is an electro-hydraulic braking system.

20. The braking system of claim 12, wherein the brake pedal force sensor comprises a hydraulic brake pedal emulator.

* * * * *